(12) United States Patent
Wada et al.

(10) Patent No.: US 10,077,989 B2
(45) Date of Patent: Sep. 18, 2018

(54) NAVIGATION DEVICE, NAVIGATION METHOD, AND NON-TRANSITORY COMPUTER READABLE STORAGE MEDIUM

(71) Applicant: YAHOO JAPAN CORPORATION, Tokyo (JP)

(72) Inventors: Yusuke Wada, Tokyo (JP); Katsufumi Asai, Tokyo (JP); Ikuo Akutagawa, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 260 days.

(21) Appl. No.: 14/991,499

(22) Filed: Jan. 8, 2016

(65) Prior Publication Data

US 2016/0273930 A1    Sep. 22, 2016

(30) Foreign Application Priority Data

Mar. 19, 2015 (JP) ................................. 2015-056068

(51) Int. Cl.
 *G01C 21/36* (2006.01)
 *G01C 21/34* (2006.01)
 *G08G 1/0968* (2006.01)

(52) U.S. Cl.
 CPC ..... *G01C 21/3626* (2013.01); *G01C 21/3438* (2013.01); *G08G 1/096883* (2013.01)

(58) Field of Classification Search
 None
 See application file for complete search history.

(56) References Cited

U.S. PATENT DOCUMENTS 5,732,385 A * 3/1998 Nakayama ......... G01C 21/3635
                                                340/995.14
6,424,910 B1 * 7/2002 Ohler ................. G01C 21/3438
                                                340/988
(Continued)

FOREIGN PATENT DOCUMENTS

JP    2008-233036 A    10/2008
JP    2008-298490 A    12/2008
(Continued)

OTHER PUBLICATIONS

Nov. 22, 2016 Office Action issued in Japanese Patent Application No. 2015-056068.

*Primary Examiner* — Nicholas K Wiltey
(74) *Attorney, Agent, or Firm* — Oliff PLC (57) ABSTRACT

A navigation device navigating a moving body based on position information includes a coordinated operation unit that initiates and ends a coordinated operation among a plurality of navigation devices; a guiding unit that performs navigation in at least one of the navigation devices performing the coordinated operation, while providing a screen display based on a designated position; and a second operating unit that performs a second operation in a navigation device other than a currently navigating navigation device performing the coordinated operation, the second operation including receiving an operation for a function that is not displayed on the screen of the currently navigating navigation device, and reflecting a position acquired as a result of the operation, to the other navigation devices performing the coordinated operation.

16 Claims, 10 Drawing Sheets

(56) References Cited

U.S. PATENT DOCUMENTS

| | | | | |
|---|---|---|---|---|
| 6,944,443 B2* | 9/2005 | Bates | | H04W 4/02 340/903 |
| 7,058,507 B2* | 6/2006 | Saiki | | G01C 21/3438 340/988 |
| 7,136,747 B2* | 11/2006 | Raney | | G01C 21/20 340/539.12 |
| 7,877,205 B2* | 1/2011 | Jang | | G01C 21/362 701/423 |
| 8,352,111 B2* | 1/2013 | Mudalige | | G08G 1/163 340/435 |
| 8,494,764 B2* | 7/2013 | Lappe | | G01C 21/28 340/995.19 |
| 8,577,589 B2* | 11/2013 | Shin | | G01C 21/3415 455/456.3 |
| 8,756,501 B1* | 6/2014 | Karam | | H04L 51/32 715/700 |
| 8,812,021 B2* | 8/2014 | Williams | | H04W 4/023 455/456.1 |
| 8,930,122 B2* | 1/2015 | Burke | | G08G 1/22 701/117 |
| 8,965,407 B2* | 2/2015 | Dave | | H04W 4/206 455/414.1 |
| 9,264,849 B1* | 2/2016 | Kahn | | G06Q 10/1095 |
| 2003/0060973 A1* | 3/2003 | Mathews | | G01C 21/26 701/410 |
| 2006/0155460 A1* | 7/2006 | Raney | | G01C 21/20 701/468 |
| 2008/0234925 A1* | 9/2008 | Lo | | G01C 21/3691 701/533 |
| 2009/0054086 A1* | 2/2009 | Kim | | G01C 21/3438 455/457 |
| 2009/0105941 A1* | 4/2009 | Johnston | | G01C 21/3438 701/533 |
| 2010/0003967 A1* | 1/2010 | Datta | | H04W 4/00 455/412.1 |
| 2010/0256852 A1* | 10/2010 | Mudalige | | G08G 1/163 701/24 |
| 2011/0028132 A1* | 2/2011 | Bos | | H04M 3/42348 455/414.2 |
| 2011/0113148 A1* | 5/2011 | Salmela | | G01C 21/3438 709/229 |
| 2013/0080204 A1* | 3/2013 | Khorashadi | | G06Q 10/109 705/7.19 |
| 2014/0005941 A1* | 1/2014 | Paek | | G01C 21/3438 701/533 |
| 2014/0148994 A1* | 5/2014 | Ando | | G08G 1/22 701/36 |
| 2014/0156177 A1* | 6/2014 | Caskey | | G08G 1/00 701/117 |
| 2014/0278027 A1* | 9/2014 | Burke | | G08G 1/22 701/117 |
| 2015/0211880 A1* | 7/2015 | Arita | | G09B 29/106 701/409 |
| 2016/0071418 A1* | 3/2016 | Oshida | | G08G 1/22 701/23 |
| 2016/0131490 A1* | 5/2016 | Kimes | | G01C 21/343 701/440 |
| 2016/0258768 A1* | 9/2016 | Langnickel | | G01C 21/3438 |
| 2016/0273930 A1* | 9/2016 | Wada | | G01C 21/3626 |
| 2016/0358479 A1* | 12/2016 | Riedelsheimer | | H04L 67/12 |

FOREIGN PATENT DOCUMENTS

| | | |
|---|---|---|
| JP | 2009-210360 A | 9/2009 |
| JP | 2013-124951 A | 6/2013 |

\* cited by examiner

FIG.3

FIG.4A
NAVIGATING

FIG.4B
SECOND OPERATION

FIG.5

| TERMINAL ID | GROUP | COORDI-NATED OPERATION TYPE | START TIME | MODE | LEADER/FOLLOWER |
|---|---|---|---|---|---|
| A02 (T1) | G58 | INTRA-VEHICLE | 18:31 | DRIVER | (NONE) |
| B37 (T2) | | | | PASSENGER | (NONE) |
| ..... | ..... | ..... | ..... | ..... | ..... |

FIG.6

| TERMINAL ID | DESTINA-TION | VIA POINT 1 | VIA POINT 2 | VIA POINT 3 | CURRENT POSITION |
|---|---|---|---|---|---|
| A02 (T1) | 35.17··· | 35.17··· | (NONE) | (NONE) | 35.17··· |
| B37 (T2) | 35.17··· | (NONE) | (NONE) | (NONE) | ..... |
| ..... | ..... | ..... | ..... | ..... | ..... |

VEHICLE "A"
TERMINAL T1
REPRESENTATIVE (NAVIGATING)

FIG.9B

VEHICLE "A"
TERMINAL T2
PASSENGER (SECOND OPERATION)

FIG.9C
VEHICLE "B"
TERMINAL T3
REPRESENTATIVE (NAVIGATING)

FIG.9D
VEHICLE "B"
TERMINAL T4
PASSENGER (SECOND OPERATION)

FIG.10A

LEADER VEHICLE "C"
TERMINAL T1
(NAVIGATING)

FIG.10B

LEADER VEHICLE "D"
TERMINAL T2
(NAVIGATING)

NAVIGATION DEVICE, NAVIGATION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2015-056068 filed in Japan on Mar. 19, 2015.

BACKGROUND OF THE INVENTION

1. Field of the Invention

The present invention relates to navigation of a moving body.

2. Description of the Related Art

In the field of navigation for navigating a user to a destination, there has been some technologies developed assuming a scenario in which a plurality of users travel together by one or more automobiles to the same destination. Japanese Patent Application Laid-open No. 2013-124951, for example, discloses a technology for allowing a user to cause one of a plurality of navigation devices to transmit a suggestion of a change in the destination to where the user is supposed to meet the others to the other navigation devices, and allowing the users onboard the other respective vehicles to respond as to whether such a suggestion is acceptable by making an operation on their navigation devices.

Such operations for making a suggestion or a response by a driver him/herself who is driving the vehicle should be avoided for the purpose of ensuring safety. Furthermore, it is sometimes troublesome, or even difficult, to make a brief stop to make such an operation, e.g., when the driver is driving on an expressway.

SUMMARY OF THE INVENTION

It is an object of the present invention to at least partially solve the problems in the conventional technology.

According to one aspect of an embodiment, an navigation device includes a coordinated operation unit that initiates and ends a coordinated operation among a plurality of navigation devices; a guiding unit that performs navigation in at least one of the navigation devices performing the coordinated operation, while providing a screen display based on a designated position; a second operating unit that performs a second operation in a navigation device other than a currently navigating navigation device performing the coordinated operation, the second operation including receiving an operation for a function that is not displayed on the screen of the currently navigating navigation device, and reflecting a position acquired as a result of the operation, to the other navigation devices performing the coordinated operation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment (hereinafter, referred to as an "embodiment") will now be explained, as an example, with reference to some drawings. The same assumptions used in the embodiment, but already described above in Description of the Related Art or in any other sections, will be omitted hereunder.

1. Configuration

The embodiment is related to a navigation device (hereinafter, referred to as a "terminal" or a "terminal T") for improving the ease-of-use in a scenario in which a plurality of users travel together while ensuring driving safety, by controlling a coordinated operation among a plurality of terminals T.

Assumed herein as a terminal T is a navigation application program (hereinafter, simply referred to as an "application") installed on a smartphone, but the computer program may be preinstalled at the time of manufacture. Furthermore, any other information processing apparatus such as a tablet PC, a mobile telephone terminal, a wearable device such as a watch or glasses may be used, without limitation to the smartphone.

Figure 1:
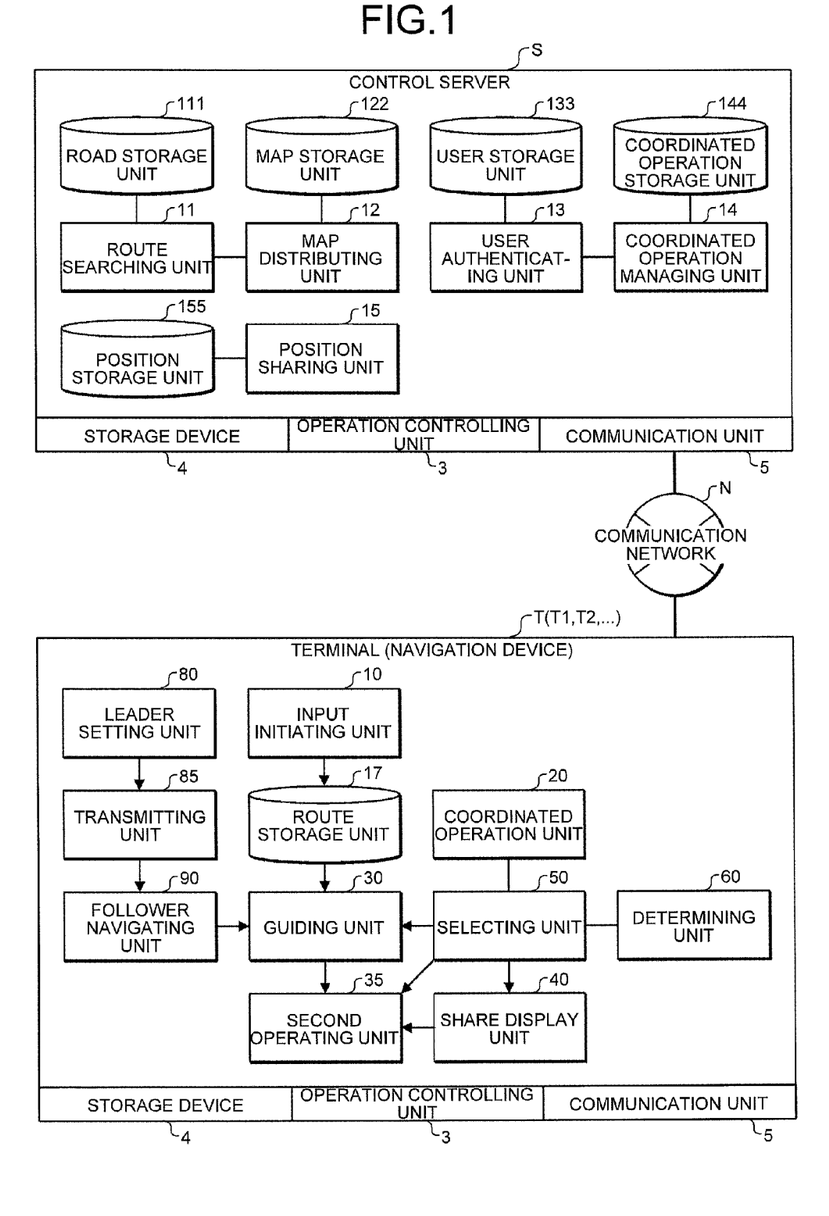
FIG. 1 is a functional block diagram illustrating a configuration according to an embodiment.

FIG. 1 illustrates the overall configuration according to the embodiment. This navigation system according to the embodiment is a client-server navigation system including a plurality of terminals T carried onboard a plurality of vehicles by users, a control server S for authenticating users via the application on the terminal T and for performing navigation-related information processing (e.g., for searching for a route, providing map information, controlling a coordinated operation among the terminals T, and sharing position information), and a communication network N (the Internet or a mobile phone network) connecting the terminals T and the control server S.

Each of these devices (the terminal T and the control server S) includes components included in a computer, such as an operation controlling unit 3 such as a central processing unit (CPU), a storage device 4 such as a main memory and an auxiliary storage device, and a communication unit 5 (such as communication equipment or a communication adaptor) for communicating with the communication network N.

In addition to the components included in a computer, the terminal T also includes hardware and software, not illustrated, for establishing telephone conversations and communications, for receiving inputs and making outputs via a touch panel screen or other components, for making positional measurements via a global positioning system (GPS) or other devices, and for controlling an internal battery, for example.

Figure 2:
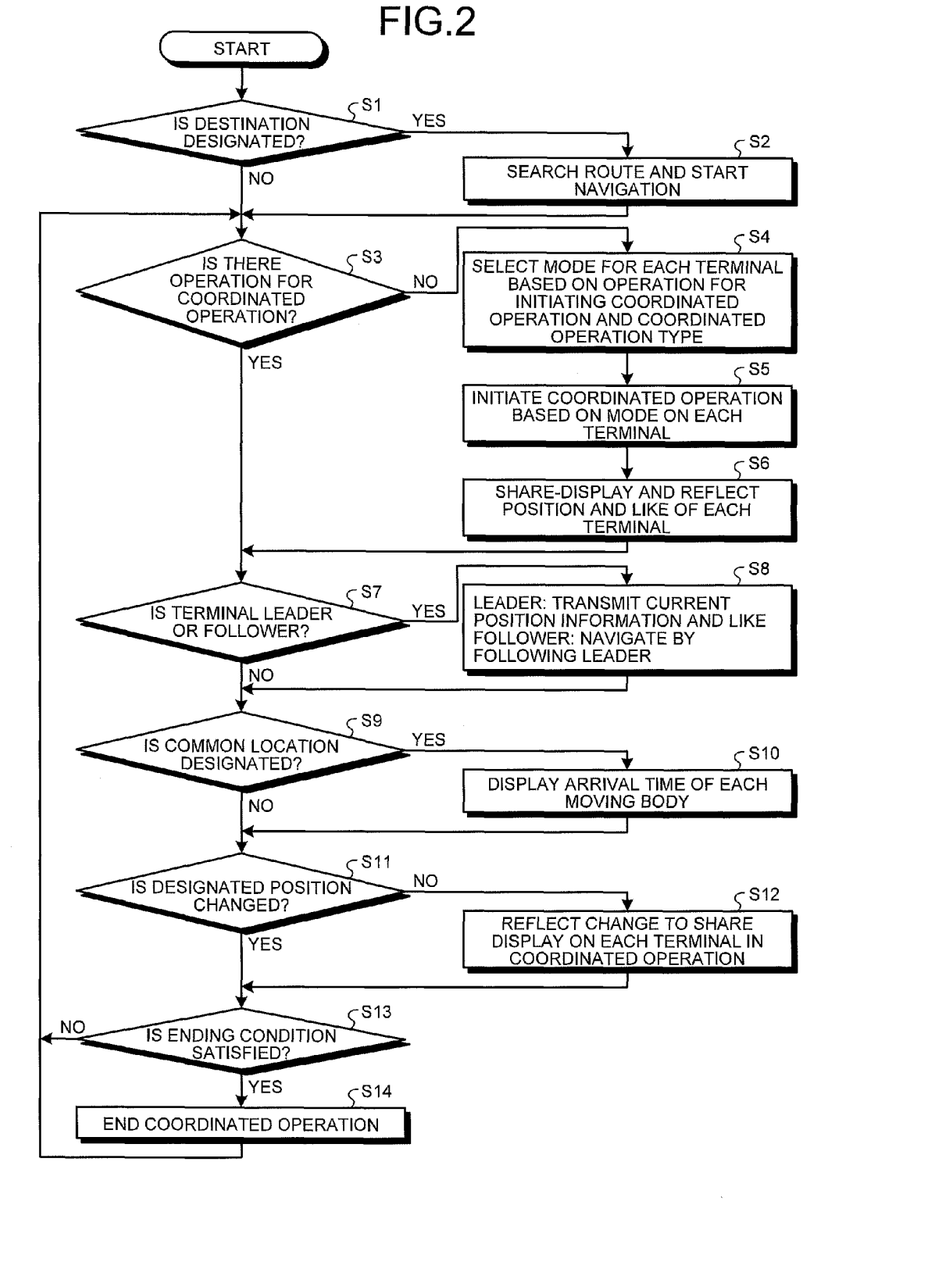
FIG. 2 is a flowchart illustrating an exemplary operation according to the embodiment.

Each of these devices (the terminal T and the control server S) implements the modules illustrated in FIG. 1 by causing the operation controlling unit 3 to execute the application stored in the storage device 4. These modules are virtual circuit modules corresponding to the functions and the operations that will be described later. FIG. 2 is a flowchart illustrating an exemplary operation according to the embodiment.

2. Ordinary Navigation

Figure 3:
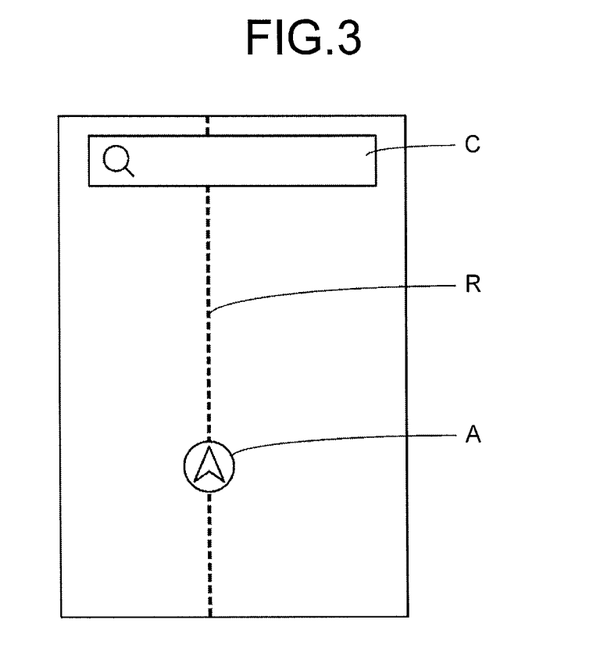
FIG. 3 is a schematic illustrating an exemplary screen display (an initial screen) according to the embodiment.

FIG. 3 illustrates an initial screen presented after the application is started, and including a road R (represented as a dotted line for the purpose of illustration), an onboard vehicle position mark A plotted on the road R, and a search window C. A user can designate a destination by zooming and scrolling a map and holding down a certain location, or by entering a destination name, an address, or a telephone number, or the like to the search window C, and searching for the corresponding facility or geographical name, and use the route navigation.

Figure 4A:
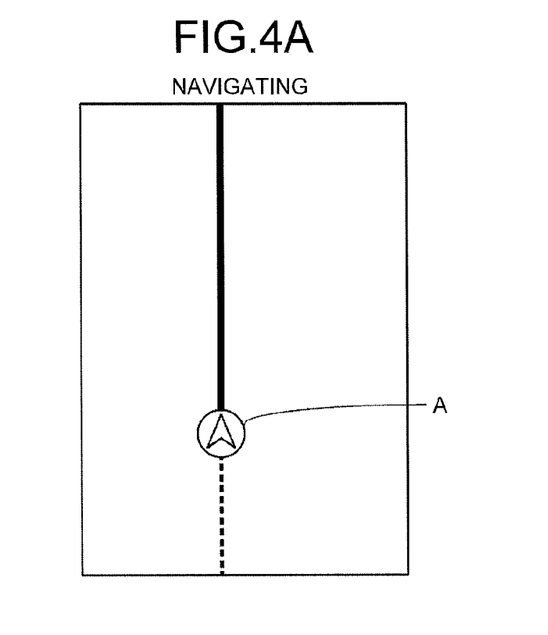
FIGS. 4A and 4B are schematics illustrating an exemplary screen display (during navigation) and another exemplary screen display (during a second operation), respectively, according to the embodiment.

In other words, when an input initiating unit 10 in the terminal T receives an input of a destination from a user ("YES" at Step S1 in FIG. 2), the terminal T starts route search and navigation (Step S2). FIG. 4A provides an exemplary navigation screen, and a navigation route is presented in front of the onboard vehicle position mark A (illustrated in a thick solid line for the purpose of illustration), but not the search window C.

Specifically, when the input initiating unit 10 in the terminal T transmits the current position information of the terminal T and a destination to the control server S, a route searching unit 11 in the control server S refers to a road storage unit 111, and calculates a navigation route using an A-star algorithm, a Dijkstra's algorithm, or any other route searching algorithm based on the road data representing a network structure of the roads, and transmits the navigation route to the terminal.

The input initiating unit 10 in the terminal then receives the navigation route from the control server S, and causes a route storage unit 17 to store the navigation route therein. In response to a navigation start operation performed by a user, a guiding unit 30 outputs a navigation, such as the direction in which the vehicle should follow, at each guidance point along the navigation route. During the navigation, the navigation route and the current vehicle position (the position of the vehicle having the terminal onboard) are displayed in the screen in a manner superimposed over a map. As the map data used in this display, a map distributing unit 12 in the control server S extracts a predetermined area including some area in front of and around the current position transmitted by each of the terminals T as the vehicles move from the map stored in a map storage unit 122, and distribute the extraction to the terminals T.

Before navigation is started, users can access a location search function for searching for a geographical name or a facility name via the search window on the map screen, but the search window is not included in the application screen during the navigation, and users cannot access functions such as the location search, unless the navigation is once ended.

3. Initiating Cooperative Operation

In the embodiment, a position can be shared among a plurality of terminals T by causing the terminals T to operate coordinately. Specifically, a coordinated operation unit 20 in each of the terminals works together with a coordinated operation managing unit 14 in the control server S to initiate (Step S5) and to end (Step S14) the coordinated operation among the terminals T in response to a predetermined operation (Step S3) or under a predetermined condition. An example of the condition for automatically initiating the coordinated operation is for the terminals that are pre-registered as counterparts of the coordinated operation to move near one another within a predetermined distance. As an exemplary operation for initiating the coordinated operation, a user may read identification information displayed on the application screen of one terminal T (for example, T1), using a camera on another terminal T (for example, T2).

To enable such an operation, the coordinated operation unit 20 initiates the coordinated operation between one terminal T and the other terminal T, by causing the one terminal T1 attempting to initiate the coordinated operation to display predetermined identification information on the application screen thereof, and allowing the other terminal T2 to read the displayed identification information using a camera provided to the terminal T2. The identification information may be, for example, a two-dimensional barcode representing a uniform resource locator (URL) including the identification information of the terminal that is attempting to initiate the coordinated operation (for example, terminal T1) as a parameter.

Figure 5:
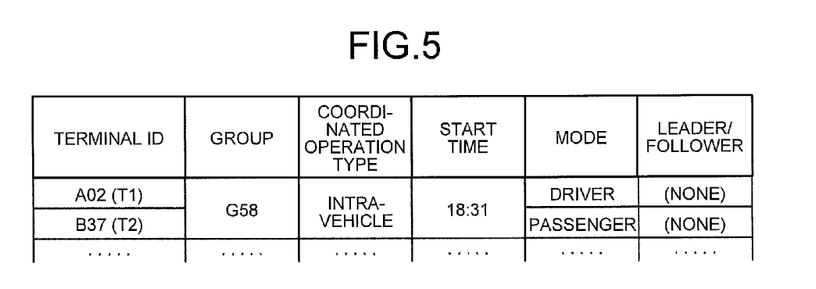
FIG. 5 is a schematic illustrating exemplary data (coordinated operation group) according to the embodiment.

The coordinated operation unit 20 in the terminal T2 having read the two-dimensional barcode accesses an URL resulting from adding a parameter corresponding to the identification information of the terminal T2 to the URL decoded from the two-dimensional barcode including the parameter of the terminal T1. This URL is an application programming interface (API) for the coordinated operation managing unit 14 in the control server S, for example. The coordinated operation managing unit 14 then groups the terminal T1 and the terminal T2, which are two terminals appended to the URL as parameters, together as the terminals of users who are travelling together, and causes the group to be stored in a coordinated operation storage unit 144. FIG. 5 provides an exemplary data for managing the coordinated operations in units of a group.

A coordinated operation can be initiated by reading the two-dimensional barcode only with a terminal T authenticated via the control server S authenticating the terminals T. This authentication ensures the security by preventing a coordinated operation from being initiated with an unexpected counterpart due to reasons such as the leakage of the two-dimensional barcode.

Therefore, if one or both of the applications that are attempting to initiate the coordinated operation read the two-dimensional barcode before logging into the control server S, the control server S requests a log-in from the unlogged user, and the coordinated operation is only established after both of the counterparts have logged-in. The log-in authentication is performed by a user authenticating unit 13, and a user storage unit 133 storing therein user information such as user IDs and passwords in the control server S.

The coordinated operation may also be initiated by allowing a user who has already been authenticated to log-in with an ID or other information to enter or to select the identification information (such as a log-in ID, or a unique nickname used in the service) of a counterpart, instead of using a two-dimensional barcode.

When the coordinated operation is initiated in such a manner, the coordinated operation unit 20 works together with the coordinated operation managing unit 14 in the control server S. One terminal that is attempting to initiate a coordinated operation (hereinafter, referred to as an "initiator") receives a designation of identification information of the terminal with which the coordinated operation is to be established (hereinafter, referred to as an "acceptor"), sends a notification of the coordinated operation request issued by the initiator to the acceptor, waits for an accepting operation of the acceptor, and then initiates, that is, establishes the coordinated operation.

As another example of an operation for initiating the coordinated operation, users may shake their terminals near each other simultaneously, or lightly hit their terminals together. The coordinated operation may then be initiated by matching the resultant outputs from the internal acceleration meters, or matching the measured positions acquired by the global positioning system (GPS) or wireless LAN waves.

4. Modes of Cooperative Operation and Mode Selection

When the coordinated operation is started, the guiding unit 30 in at least one of the terminals T with an active coordinated operation performs the navigation, with a screen presenting a navigation route determined based on the designated location and the current position (for example, FIG. 4A). The status of the navigating terminal T with an active coordinated operation is hereinafter referred to as being in a driver mode ("Driver" specified in the "Mode" section in FIG. 5).

A terminal T to be shifted to the driver mode is automatically or manually selected from a group of terminals T involved in the coordinated operation (hereinafter, referred to as a "coordinated operation group") (Step S4). For example, when the coordinated operation is initiated with the operation using a two-dimensional barcode as described above, the terminal T1 displaying the two-dimensional barcode is shifted to the driver mode, and the other one or more terminals reading the two-dimensional barcode (for example, T2, T3, and the like) are shifted to a passenger mode (simply "Passenger" is specified in the "Mode" section in FIG. 5).

The passenger mode is a mode in which any of the terminals T in the coordinated operation (for example, T2) excluding the navigating terminal T (for example, T1) performs a second operation for receiving an operation of functions that are not presented to the navigating terminal T (e.g., a location search function for searching for a geographical name or a facility name via the search window on the map screen) (FIG. 4B), and reflecting the position acquired as a result of the operation to the other terminals T in the coordinated operation. Such a second operation is performed by a second operating unit 35.

Explained now is another example in which a terminal T to be shifted to the driver mode is selected from the terminals T in the coordinated operation group. With only the coordinated operation established, as an example, the screens on the respective terminal Ts in the coordinated operation group remain at the initial screen. Once any one of the terminals T in the coordinated operation starts navigating, the other terminals T are notified of the start of the navigation, and the second operating unit 35 starts the second operation. As another example, the second operating unit 35 starts the second operation when the coordinated operation unit 20 initiates the coordinated operation with a currently navigating terminal T.

To end the coordinated operation (Steps S13, S14), a user may perform an explicit ending operation on any one of the terminals T in the coordinated operation group, causing only the specific terminal T to end the coordinated operation thereby. As another example, when an explicit ending operation is made on the first terminal having been shifted to the driver mode or on the last terminal T remaining in the driver mode, the coordinated operation may be ended in all of the terminals T in the coordinated operation group, including the remaining terminals in the passenger mode in the coordinated operation group. The coordinated operation may also be ended when a predetermined time (for example, 24 hours) elapses from when the coordinated operation is initiated, or when the position information acquired by GPS or other devices become separated by a predetermined distance or more.

5. Sharing Positions

Figure 4B:
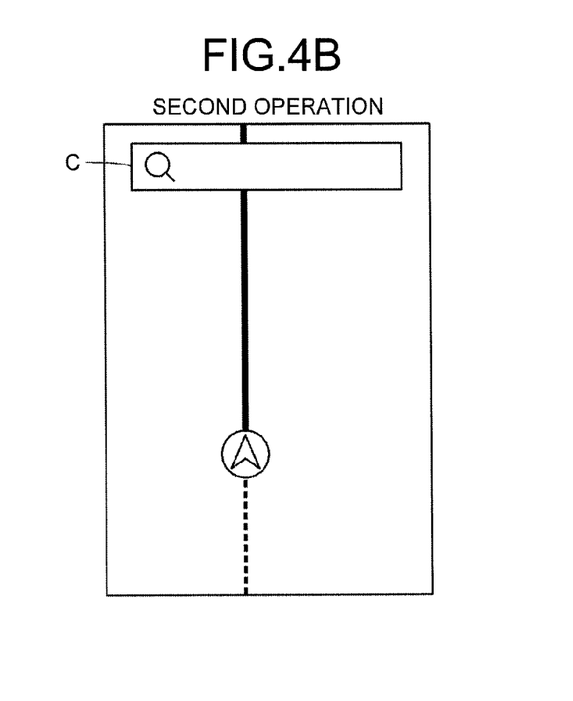

The terminals T in the coordinated operation can share positions related to the terminals T. In this case, a share display unit 40 in each of the terminals T share-displays all or at least some of the positions related to the other terminals T in the coordinated operation (such as the current position, a destination, a via point) as icons or other graphics on the map screen (Step S6). Assuming that there are two terminals T in the coordinated operation, for example, the current position of the terminal T1, which is the position of the terminal in the driver mode, is displayed in the navigation map screen on the terminal T1 (FIG. 4A), as well as on the map screen of the terminal T2 that is in the passenger mode operating the second operation (FIG. 4B).

Figure 6:
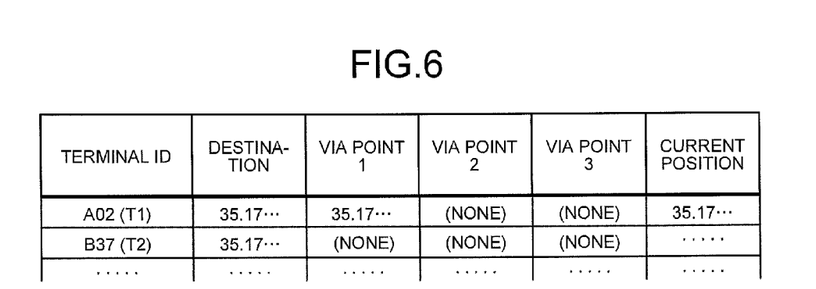
FIG. 6 is a schematic illustrating exemplary data (positions) according to the embodiment.

FIG. 6 illustrates an example of information indicating the positions related to the terminals T. A position sharing unit 15 in the control server S collects such information from the terminals T, causes the information to be stored and updated in a position storage unit 155, and distributes the information to the other terminals T in the coordinated operation group so that such information can be used to display the positions in a shared manner, as described so far.

When designated one of the positions (such as a destination and a via point) displayed in a shared manner is changed, including the time during which the terminal T is navigating based on the position (Step S11), the share display unit 40 reflects the change (such as a change in the destination, or an addition, a change, or deletion of a via point) as needed, that is, in real-time, to the shared display on the respective terminals T in the coordinated operation (Step S12).

6. Selections of Cooperative Operation Types

In the coordinated operation, different types of coordinated operations can be selected. For example, during the operation of initiating the coordinated operation, a selecting unit 50 may select an inter-vehicle coordinated operation, as well as an intra-vehicle coordinated operation (the coordinated operation described above). A user may make this selection by making an operation designating the type, or this selection may be made automatically based on the positional relations between the terminals.

As a reference for automatically selecting a type, the selecting unit 50 may select the intra-vehicle coordinated operation when the result of matching the measured positions of the terminals T acquired from GPS or other devices is within a predetermined distance. The selecting unit 50 may also select the intra-vehicle coordinated operation when short-distance wireless communication is established, or select the intra-vehicle coordinated operation when the result of measuring electrical filed intensities, such as the wireless LAN waves of the terminals, is equal to or higher than a predetermined level.

When selected is the intra-vehicle coordinated operation, the second operating unit 35 in the terminal T in the passenger mode in the coordinated operation group can perform the second operation, without causing the share display unit 40 to display the vehicle having the terminals onboard on the map screen. It is, however, also possible to display the vehicle having the terminals onboard on all of the terminals T in the coordinated operation group, as illustrated in FIGS. 4A and 4B.

When the inter-vehicle coordinated operation is selected, the terminals T provide the navigations related to the respective vehicles (FIG. 4A). The positions (such as a destination and a via point) related to the terminals may be different among the terminals T, but the share display unit 40 share-displays the positions related to both of the terminals T (such as the current positions, the destinations, and via points) on the map screen, as icons, for example (Step S6).

Figure 7A:
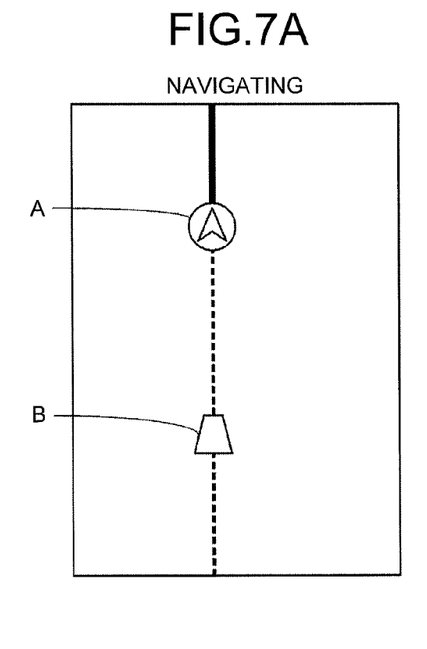
FIGS. 7A and 7B are schematics illustrating exemplary screen displays (with positions shared) according to the embodiment.
Figure 7B:
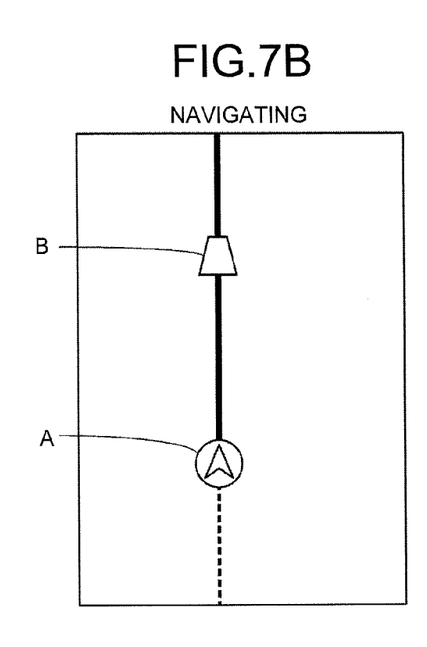
Figure 8A:
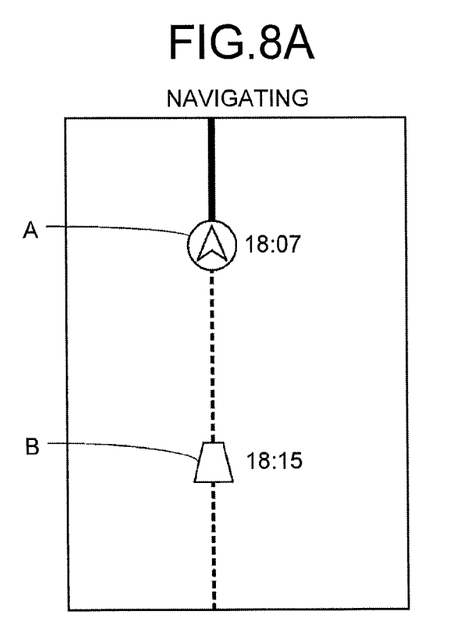
FIGS. 8A and 8B are schematics illustrating exemplary screen displays (with positions and time shared) according to the embodiment.
Figure 8B:
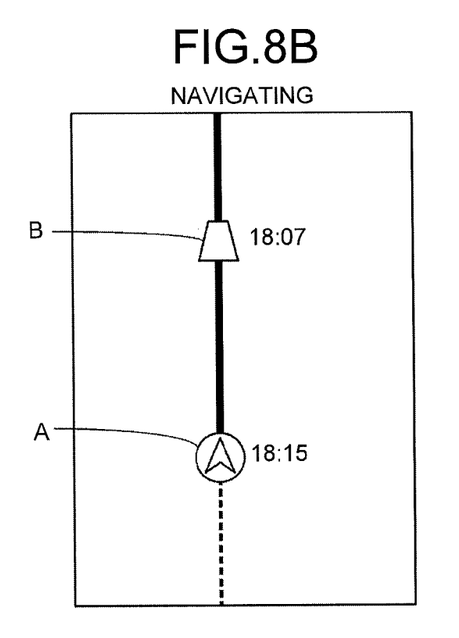
Figure 9A:
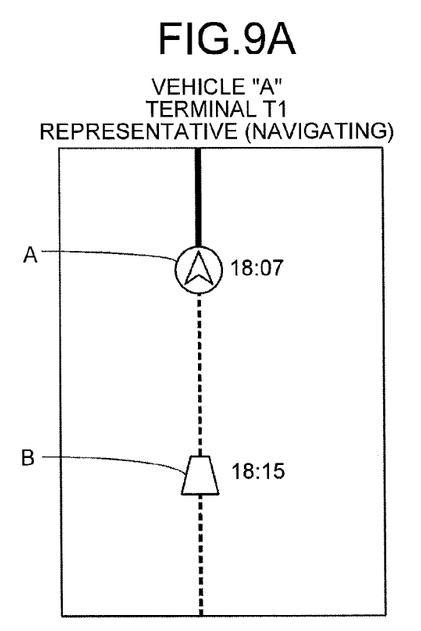
FIGS. 9A to 9D are schematics illustrating exemplary screen displays (with both of internal and inter-vehicle coordinated operations being activated) according to the embodiment.
Figure 9B:
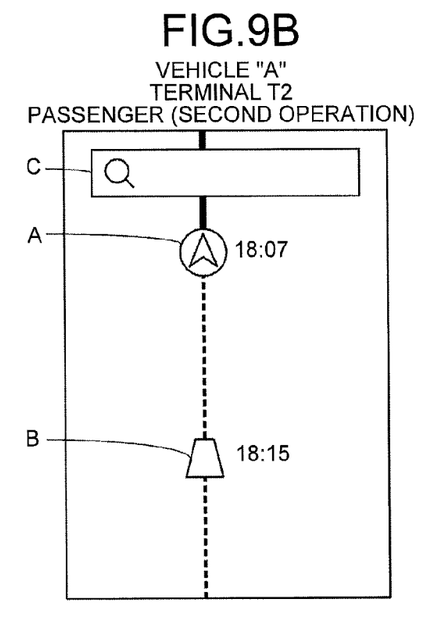
Figure 9C:
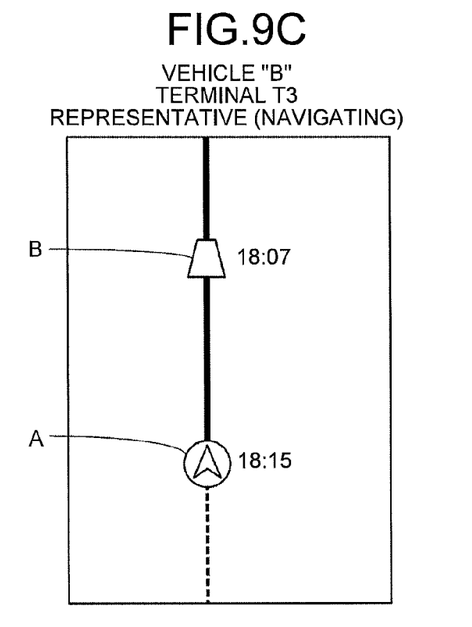
Figure 9D:
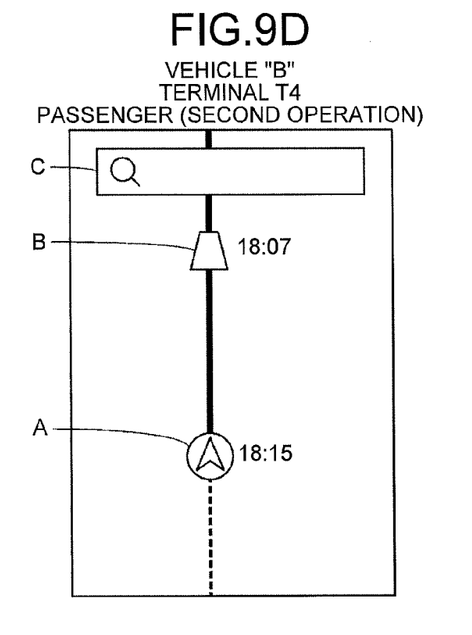

FIG. 7A illustrates a navigation screen on the terminal T1, and FIG. 7B illustrates a navigation screen on the terminal T2, while the terminals T1 and T2 are both operating in the inter-vehicle coordinated operation. These vehicles are passenger the same road (dotted line), and the onboard vehicle position mark A and the counterpart vehicle mark B are displayed in opposite positions, and the lengths of the navigation route (thick solid line) connected to the onboard vehicle position mark A are also different. When the same common position (e.g., a destination or a via point) is set to a plurality of terminals T during the coordinated operation ("YES" at Step S9), the estimated (expected) arrival time at which each of the terminals T in the coordinated operation is expected to arrive at the same position is displayed on the screen of each of the terminals T (Step S10; see FIG. 8, for example).

The intra-vehicle coordinated operation may be used simultaneously with the inter-vehicle coordinated operation, as illustrated as an example in FIGS. 9A to 9D. In such an simultaneous operation, the guiding unit 30 in at least one representative terminal T designated correspondingly to each of the vehicles (the terminal T1 on the vehicle "A" in FIG. 9A, and the terminal T3 on the vehicle "B" in FIG. 9C) performs the navigation, and the second operating units 35 in the respective terminals T other than the representative terminal (the terminal T2 in the vehicle "A" in FIG. 9B, and the terminal T4 in the vehicle "B" in the FIG. 9D) perform the second operation. The share display unit 40 in each of the terminals T (T1, T2, T3, and T4) involved in the inter-vehicle coordinated operation share-displays the current positions of the representative terminals T (the terminal T1 on the vehicle "A" in FIG. 9A and the terminal T3 on the vehicle "B" in FIG. 9C) on their map screen.

A determining unit 60 determines which one of the intra-vehicle coordinated operation or the inter-vehicle coordinated operation is used, and whether the positions of the terminals satisfy the condition for such an operation, by matching the position information of the terminals T or by determining whether the short-distance wireless communication is established. If the terminals do not satisfy the condition, the determining unit 60 may suggest a setting change to a user, and change the setting after the user makes an operation for accepting the change.

It is preferable for the share display unit 40 in the currently navigating terminal T1 in the coordinated operation with another terminal T (that is, a terminal in the driver mode) (e.g., FIG. 4A) to receive a change in the designated position (such as a change in a destination, or an addition, a change, or deletion of a via point) only from another terminal T2 currently in the intra-vehicle coordinated operation (that is, a terminal in the passenger mode) (e.g., FIG. 4B).

In response to the received change, the guiding unit 30 in the terminal T1 operating in the driver mode, in principle, requests rerouting from the control server S. In this manner, the driver can focus on driving safely following the navigation, while allowing a passenger to perform operations such as searching for a facility, and setting a via point based on the search result. In this manner, such tasks can be distributed among the driver and the passengers, and the ease-of-use can be improved while ensuring the safety.

7. Leader and Followers

Figure 10A:
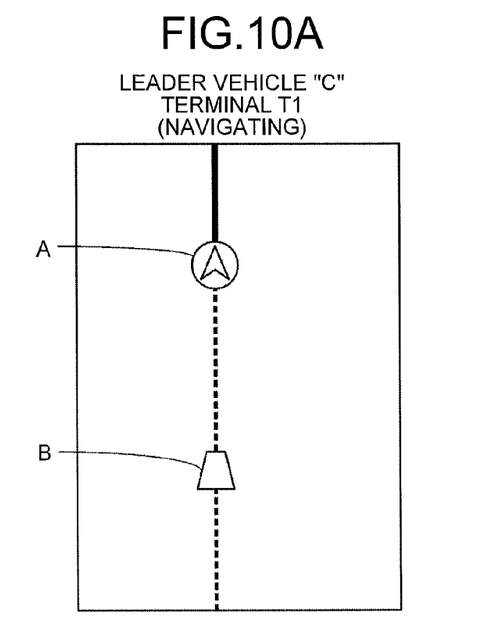
FIGS. 10A and 10B are schematics illustrating an exemplary screen display (of a leader) and another exemplary screen display (of a follower), respectively, according to the embodiment.
Figure 10B:
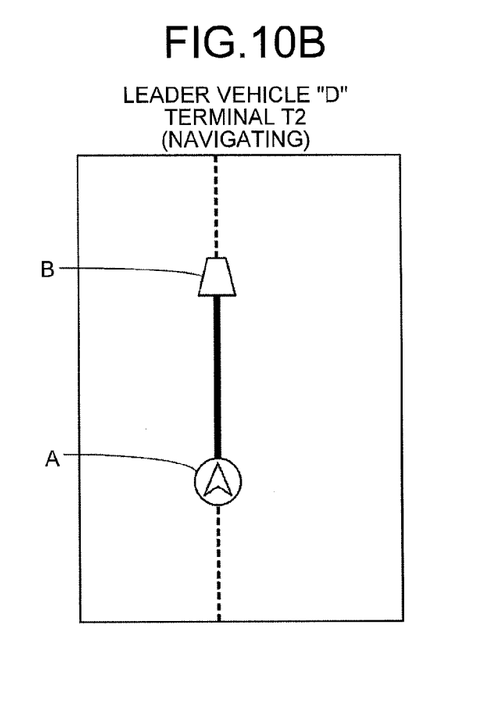

The embodiment may also be used to allow one of a plurality of vehicles serving as a leader vehicle to lead the other vehicles that are followers of the leader vehicle (for example, FIG. 10). In such a configuration, a leader setting unit 8 in any one of the terminals T in the coordinated operation group designates one of the terminals T involved in the coordinated operation as a leader vehicle (a terminal corresponding to the leader vehicle). The leader may also be designated by causing a leader setting unit 80 in the terminal T1 which is to be used on the leader vehicle to receive a predetermined operation on the terminal T1, and to transmit a signal notifying the other terminals T2 that operation to be performed on the terminal T1 will be those of the leader vehicle, and instructing other terminals T2 in the coordinated operation group to operate as follower vehicles, for example.

The same setting may be achieved by causing the leader setting unit 80 in a terminal T2 which is to be used on the follower vehicle to receive a predetermined operation for designating the leader vehicle using the ID of the terminal T1 which is to be used on the leader vehicle, as well as for designating the terminal T2 itself as a follower vehicle, and to transmit a signal designating the terminal T1 on the leader vehicle "C" as a leader vehicle. The leader setting unit 80 in the terminal T2, which is used on a follower vehicle, may also designate the terminals T corresponding to the other vehicles that are to be follower vehicles of the same leader vehicle "C", and to transmit a signal designating the other vehicles as the follower vehicles.

Once the leader vehicle is designated, the terminal T1 on the leader vehicle "C" transmits its current position to a follower vehicle "D" directly or via the control server S (Steps S7 and S8), and a follower navigating unit 90 in the terminal T2 on the follower vehicle "D" that is the terminal other than the leader vehicle "C" involved in the coordinated operation outputs navigation by searching a route using the constantly changing current position of the leader vehicle "C" as a moving destination (Steps S7 and S8).

A transmitting unit 85 in the leader vehicle transmits the information related to the movement of the leader vehicle (for example, a change or an addition of the destination or a via point, a setting or a change of a navigation route by auto-rerouting, for example, the speed per hour, and an entry into an expressway) to the follower vehicle, as needed, and the follower navigating unit 90 in the terminal T on the follower vehicle performs the necessary rerouting and navigation based on the movement related information received from the leader vehicle.

8. Advantageous Effects

The embodiment described above can achieve following advantageous effects:

(1) Provided that a plurality of terminals are caused to operate coordinately, and that at least one of the terminals performs navigation, the other devices perform the second operation in which position information resultant of an operation such as a search is transmitted to the other devices. In this manner, the driver can focus on driving safely following the navigation, while allowing a passenger to perform operations such as searching for a facility and setting a via point based on the search result. In this manner, such tasks can be distributed among the driver and the passengers, and the ease-of-use can be improved while ensuring the safety.

(2) Once one of the terminals starts the navigation after the coordinated operation is initiated, remaining terminals initiate the second operation, so that the freedom in the order at which the operations for initiating the coordinated operation and for role allotment are performed is improved.

(3) Because the second operation is initiated automatically between a currently navigating terminal and another terminal having initiated the coordinated operation, it is not necessary for a user to make any operations on the navigating terminal, the operations for initiating the coordinated operation and role allotment can be simplified.

(4) Because the coordinated operation can be initiated with a simple operation, e.g., by reading the application screen of a counterpart with the two-dimensional barcode reading function, or using a coordinated operation function of the navigation application, excellent ease-of-use can be achieved.

(5) Because the positions of the terminals in the coordinated operation are share-displayed among the terminals, the users can recognize the positions of one another even in an outer environment not permitting users to visually recognize each other, e.g., during the night time or in a bad weather, and without looking around outside of the vehicle, so that the users can travel more comfortably while caring for one another.

(6) When any position that is being share-displayed is changed, the change is reflected in real-time on the terminals in the coordinated operation. The driver can therefore ask a passenger on the same vehicle to perform various operations on the passenger's terminal, e.g., to look for a parking lot near the destination, to change the destination to the parking lot, to add a location for having a meal on the way to the destination as a via point, without any interruption to the driving following the navigation. In this manner, the convenience of the navigation is improved.

(7) When the same position is set among the terminals in the coordinated operation, an estimation of the arrival time expected for each of the moving bodies is displayed on the screens of the others. Therefore, even when the positions of the vehicles travelling to the same location are separated from one another, users can recognize how early or late the others are will be arriving. The users can therefore make better use of the time by going on an errand, for example, when the counterpart is behind, or change a route to another using an expressway. In this manner, users can take planned actions rationally.

(8) While display of the position of the vehicle on which the corresponding terminal is onboard is omitted during the intra-vehicle coordinated operation because such display is less necessary, the positions of the representative terminals on a plurality of respective vehicles are share-displayed during the inter-vehicle coordinated operation among the vehicles. In this manner, hard-to-see display of a plurality of terminals on the same vehicle is avoided.

(9) By determining whether the actual positioning of the terminals are correct, e.g., because the terminals should be inside of one vehicle in the intra-vehicle coordinated operation, and there should be only one representative terminal performing a first operation in the same vehicle in the inter-vehicle coordinated operation, users can be promoted to make necessary setting changes, so that the intended operation can be ensured.

(10) By permitting only the navigation devices in the intra-vehicle coordinated operation to make a change in a position that might result in a route change while vehicles are passenger a navigation route following the navigation, the risk of causing confusion, due to sudden rerouting without prior agreement through conversation or other communications, can be reduced.

(11) Through a simple operation of setting a leader vehicle, navigation devices can navigate the respective vehicles to follow their leader vehicle, by performing auto-rerouting or other actions as needed, using the moving leader vehicle as a target. The users can therefore travel together even without sharing a destination, or get together even when they become separated from one another.

(12) Because information related to a movement possibly resulting in a route change is transmitted from the leader vehicle to the follower vehicles, the followers can follow the leader vehicle smoothly, using a navigation route or navigation suitable for the behavior of the leader vehicle.

9. Other Embodiments

The embodiment described above and the drawings are merely exemplary, and the presence or the arrangement of the modules, or the order or the specifics of the processes may be changed as appropriate. The modifications explained below, as some examples, and some other embodiments still fall within the scope of the embodiment. For example, because the navigation device according to the embodiment may be or may not be a specialized device, a portable device, a client-server device, or a standalone device, the embodiment may be implemented using direct (peer-to-peer) communication between the navigation devices, without the use of the control server.

A storage unit may include, without limitation to a local storage internal to the device, a remote storage such as those on network computing (cloud), and may also include functions such as data inputs and outputs, and management, in addition to providing a data storage area. Furthermore, the units of the storage unit described herein are specified for the convenience of explanation, and may be divided or integrated as appropriate. Furthermore, additional storage units for storing data to be processed, for using as a working area, and for storing processing results may be used as appropriate, in addition to the storage units explicitly described herein.

The arrows in the drawings (e.g., in FIG. 1) are provided to facilitate understanding of data flows or directions of control, and are not intended to negate the presence of any other flows and directions. Furthermore, the units other than the storage unit are processing units for implementing and executing the functions and the actions of the information processing explained above in the embodiment (e.g., those illustrated in FIG. 1), but such units are merely functional units summarized for the purpose of explanation, and do not necessarily need to match the actual hardware modules and software modules.

The embodiments can be recognized as belonging to other categorizes not described herein (a method, a computer program, and a system including a terminal). In the categories such as a method and a computer program, a "unit" described in the apparatus category should be re-interpreted as a "process" or a "step", as appropriate. Furthermore, because the "XX units" (including units, sections, or modules) explained as elements or the embodiment are not limited to hardware modules or software modules, the "XX units" may be entirely or partly re-interpreted as "XX means".

Furthermore, some of the processes and the steps described in the embodiment may be changed in order, executed together as a group, or executed separately as different parts. Furthermore, the CPU, the core, or the thread for executing the individual units or steps may be shared, or different CPUs, cores, or threads may be used depending on the individual units, steps, or timing.

Furthermore, the individual units described herein may be implemented by calling a function provided by an external server via an API or network computing (e.g., what is called a cloud). Furthermore, elements related to the embodiment such as the units may also be implemented using any other information processing mechanism, such as a physical electric circuit, without limitation to the operation controlling unit of a computer.

According to the embodiment, the ease-of-use of a navigation device can be improved in a scenario in which a plurality of users travel together while ensuring the driving safety.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A navigation system navigating a moving body based on position information, the navigation system comprising a navigation device including:
   a global positioning system (GPS) configured to detect the position information of the navigation device;
   a communication device configured to communicate with at least one second navigation device; and
   a processor operatively coupled with the GPS and the communication device, the processor being programmed to:
   detect, by the GPS, the position information of the navigation device;
   initiate a coordinated operation with the at least one second navigation device based on the detected position information compared to a position of the second navigation device, or based on a predetermined association with the at least one second navigation device;
   determine whether the at least one second navigation device is currently performing navigation by communicating with the at least one second navigation device via the communication device;
   in response to determining that the at least one second navigation device is not currently performing navigation, perform navigation via the GPS based on the detected position information and a designated position; and
   in response to determining that the at least one second navigation device is currently performing navigation, perform a second operation of a function that is not displayed on a display screen of the at least one second navigation device, the second operation being based on the position information and information related to navigation, and cause the at least one second navigation device performing navigation to display a position acquired as a result of the second operation.

2. The navigation system according to claim 1, wherein the processor is programmed to start the second operation when any of the navigation devices performing the coordinated operation starts navigation.

3. The navigation system according to claim 1, wherein the processor is programmed to start the second operation when the currently navigating navigation device and the coordinated operation is initiated.

4. The navigation system according to claim 1, wherein the processor is programmed to start the coordinated operation between the first navigation device and the at least one second navigation device, by displaying predetermined identification information on the one navigation device attempting to establish the coordinated operation, and causing the other navigation device to read the displayed identification information.

5. The navigation system according to claim 1, wherein the processor is programmed to share-display at least some of positions related to other navigation devices performing the coordinated operation, as an icon on a map screen.

6. The navigation system according to claim 1, wherein, when a designated one of positions currently being share-displayed is changed, the processor is programmed to reflect a change, as needed, on a shared display shared among the navigation devices performing the coordinated operation.

7. The navigation system according to claim 1, wherein, when a common position is designated among the navigation devices performing the coordinated operation, the processor is programmed to provide a screen display presenting estimated arrival time at which each of the navigation devices performing the coordinated operation is expected to arrive at a common position.

8. The navigation system according to claim 1, wherein:
   the processor is programmed to select one of an intra-vehicle coordinated operation and an inter-vehicle coordinated operation;
   when the intra-vehicle coordinated operation is selected, the processor is programmed to perform the second operation without displaying a position of a vehicle having the navigation device onboard on a map screen; and when the inter-vehicle coordinated operation is selected, at least one representative navigation device designated for each vehicle performs navigation, each of the navigation devices other than the representative navigation device performs the second operation, and each of the navigation devices involved in the inter-vehicle coordinated operation share-displays a current position of the representative navigation device on the map screen.

9. The navigation system according to claim 8, wherein the processor is programmed to determine whether the intra-vehicle coordinated operation or the inter-vehicle coordinated operation is to be used, and whether positions of the respective navigation device satisfy a condition for the selected coordinated operation.

10. The navigation system according to claim 8, wherein, while one navigation device having established the coordinated operation with other one navigation device is navigating, the processor is programmed to receive a change in a designated position only from the other navigation devices in the intra-vehicle coordinated operation.

11. The navigation system according to claim 1, wherein the processor is programmed to:
designate one of the navigation devices involved in the coordinated operation as a leader vehicle; and
output, in each of the navigation devices involved in the coordinated operation excluding the navigation device onboard the leader vehicle, navigation through route search that uses a constantly changing current position of the leader vehicle as a moving destination once the leader vehicle is designated.

12. The navigation system according to claim 11, wherein the processor is programmed to:
transmit information related to a movement from the leader vehicle to the navigation devices involved in the coordinated operation excluding the navigation device onboard the leader vehicle; and
in each of the navigation devices involved in the coordinated operation excluding the navigation device onboard the leader vehicle, perform required rerouting and navigation based on the information related to the movement transmitted from the leader vehicle.

13. A navigation method performed by a navigation system including a navigation device, the navigation device including a global positioning system (GPS) configured to detect the position information of the navigation device, a communication device configured to communicate with at least one second navigation device, and a processor operatively coupled with the GPS and the communication device, the navigation method comprising:
detecting, by the GPS, the position information of the navigation device;
initiating and ending a coordinated operation with the at least one second navigation device based on the detected position information compared to a position of the second navigation device, or based on a predetermined association with the at least one second navigation device;
determining whether the at least one second navigation device is currently performing navigation by communicating with the at least one second navigation device via the communication device;
in response to determining that the at least one second navigation device is not currently performing navigation, navigating via the GPS based on the detected position information and a designated position; and
in response to determining that the at least one second navigation device is currently performing navigation, performing a second operation of a function that is not displayed on a display screen of the at least one second navigation device, the second operation being based on the position information and information related to navigation, and cause the at least one second navigation device performing navigation to display a position acquired as a result of the second operation.

14. A non-transitory computer-readable storage medium with an executable program stored thereon, wherein the program instructs a computer to perform:
detecting, by a global positioning system (GPS), position information of a navigation device;
initiating and ending a coordinated operation with an at least one second navigation device based on the detected position information compared to a position of the second navigation device, or based on a predetermined association with the at least one second navigation device;
determining whether the at least one second navigation device is currently performing navigation by communicating with the at least one second navigation device via a communication device;
in response to determining that the at least one second navigation device is not currently performing navigation, navigating via the GPS based on the detected position information and a designated position; and
in response to determining that the at least one second navigation device is currently performing navigation, performing a second operation of a function that is not displayed on a display screen of the at least one second navigation device, the second operation being based on the position information and information related to navigation, and cause the at least one second navigation device performing navigation to display a position acquired as a result of the second operation.

15. A navigation system navigating a moving body based on position information, the navigation system comprising:
a first terminal and a second terminal,
the first terminal including:
a first global positioning system (GPS) configured to detect position information of the first terminal;
a first communication device configured to communicate with the second terminal and a control server providing navigation; and
a processor operatively coupled with the first GPS and the first communication device, the processor being programmed to:
initiate a coordinated operation with the second terminal;
transmit a designated position information, the detected position information, and
a coordinated information to the control server over a network and receive route information calculated by and stored in the control server over the network from the control server, the transmitting and receiving corresponding to a first operation; and
display the route information on a screen display of the first terminal, and
the second terminal including:
a second global positioning system (GPS) configured to detect position information of the second terminal;
a second communication device configured to communicate with the first terminal and the control server; and a processor operatively coupled with the second GPS and the second communication device, the processor being programmed to:
  initiate the coordinated operation with the first terminal;
  transmit the detected position information and the coordinated information to the control server over the network and receive the route information stored in the control server from the control server;
  display the route information and a search window on a screen display of the second terminal; and
  in response to determining that the second terminal is currently performing navigation, perform a second operation via the search window, the second operation including receiving an operation for a function that is not displayed on the screen of the first terminal and reflecting a position acquired as a result of the second operation in the first terminal.

16. A navigation system navigating a first moving body and a second moving body based on position information, the navigation system comprising: a first terminal in the first moving body, and a second terminal in the second moving body,
  the first terminal including:
    a first global positioning system (GPS) configured to detect position information of the first terminal;
    a first communication device configured to communicate with the second terminal and a control server providing navigation; and
    a processor operatively coupled with the first GPS and the first communication device, the processor being programmed to:
      initiate a coordinated operation with the second terminal;
      specify the first moving body as a leader vehicle based on a first operation;
      transmit a designated position information, the detected position information, and a coordinated information to the control server over a network and receive first route information calculated by the control server over the network from the control server, the first route information being route information from the detected position information of the first terminal to the designated position information;
      transmit a signal indicating that the first moving body is the leader vehicle to the second terminal over the network; and
      display the first route information on a screen display of the first terminal, and
  the second terminal comprising:
    a second global positioning system (GPS) configured to detect position information of the second terminal;
    a second communication device configured to communicate with the first terminal and the control server; and
    a processor operatively coupled with the second GPS and the second communication device, the processor being programmed to:
      initiate the coordinated operation with the first terminal;
      receive the signal indicating that the first moving body is the leader vehicle from the first terminal over the network;
      transmit the detected position information and the coordinated information to the control server over the network and receive second route information calculated by the control server from the control server, the second route information being route information from the detected position information of the second terminal to the detected position information of the first terminal;
      in response to determining that the second terminal is currently performing navigation, perform a second operation of a function that is not displayed on a display screen of the second terminal, the second operation being based on the detected position information and information related to navigation; and
      display the second route information on the display screen of the second terminal as a result of the second operation.

* * * * *